Patented Dec. 10, 1940

2,224,156

UNITED STATES PATENT OFFICE 2,224,156

SUBSTITUTED 4,4-DIAMINODIPHENYL SULPHONES AND PROCESS OF MAKING THEM

Morris S. Kharasch and Otto Reinmuth, Chicago, Ill., assignors to Eli Lilly and Company, Indianapolis, Ind., a corporation of Indiana No Drawing. Application November 24, 1939, Serial No. 305,926

42 Claims. (Cl. 260—510)

Our invention relates to certain new derivatives of 4,4'-diaminodiphenyl sulphone, and to the process of producing them.

These new products have been found to be of low toxicity, and to be efficacious on oral, parenteral, and intravenous administration for the treatment of streptococcal and pneumococcal infections, especially those of great virulence.

As illustrations of the therapeutic potency of these new products, mice are found to be effectively protected against 10,000 lethal doses of the Type I strain of pneumococcus by oral doses of the order of 5 to 10 mg. of our products, and against 10,000 lethal doses of a virulent strain of hemolytic streptococcus by oral doses of the order of 0.1 to 0.3 mg. of our products. By "effective protection" we mean that at least 40% survive at the end of 14 days. Under comparable conditions 30 mg. of sulphapyridine and 5 mg. of sulphanilamide are required to produce the same effects in pneumococcal and streptococcal infections respectively.

These new derivatives may be represented by the following general formulas:

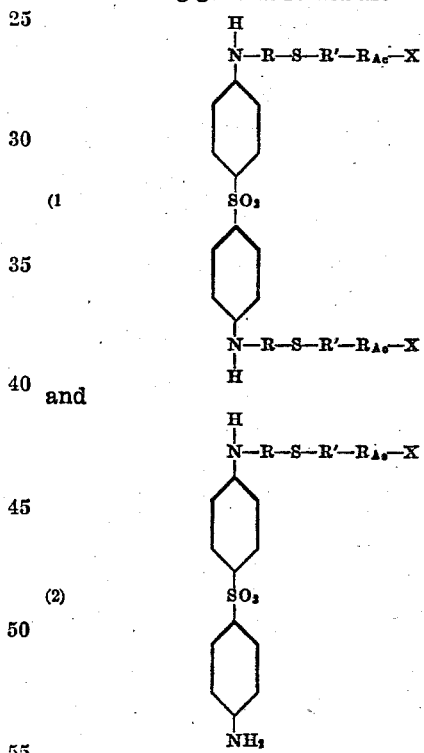

in which R represents a member of the general class of short-chain alkanal (i. e., alkylidene) and alkenylidene groups having not over six carbon atoms and desirably (for stability) not over two carbon atoms and most desirably only one carbon atom, comprising inter alia the most desirable methylene group (—$CH_2$—), the next most desirable ethylidene group

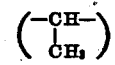

the propylidene group

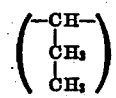

the propenylidene group

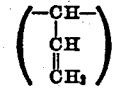

and so forth; R' represents a member of the broader general class of divalent monocarbon and polycarbon hydrocarbon groups, including inter alia the methylene group (—$CH_2$—), the polymethylene groups [e. g., the ethylene group (—$CH_2$—$CH_2$—)], the alkanal and arylalkanal groups [e. g., the ethylidene and benzal groups

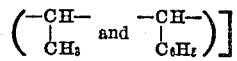

and the arylene groups [e. g., the several phenylene groups (—$C_6H_4$—)], any of which having two or more carbon atoms may have one or more of its hydrogen atoms on any carbon atom not attached to sulphur replaced by the hydroxyl group (OH) or by an acylated hydroxyl or acylated amino group; $R_{Ac}$ represents an acidic group of the class consisting of the dehydrocarboxylic $$\left(-\overset{O}{\underset{\|}{C}}-O-\right)$$

group and the dehydrosulphonic

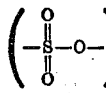

group; and X represents a member of the general class of positive ions consisting of hydrogen, the alkali metals, the alkaline-earth metals, the nitrogen hydro-onium ions derived from ammonia, the alkylamines, the alkanolamines, and the polymethylenediamines, including ethylenediamine.

The salts are all freely soluble in water, and in general relatively stable in the solid state. They are in general very slightly soluble in absolute alcohol, and insoluble in ether and benzene. The acids differ as to their solubility in water, and in general are less stable than are the salts.

In preparing our new products, we may proceed in general as follows:

To a solution (or suspension) of 4,4'-diaminodiphenyl sulphone in a suitable solvent, such as methyl or ethyl alcohol, or ethylene or propylene glycol, or dioxane, we add either one or two molecular equivalents, according to whether it is desired to obtain a substitution on one or both of the amino groups, of an aldehyde having the general formula (3)              R=O in which R has the same meaning as before; and also add one or two molecular equivalents, depending on the same consideration as before, of a mercapto acid of the general formula (4)             H—S—R'—R$_{Ac}$—H in which R' and R$_{Ac}$ have the same meaning as before.

It is desirable but not necessary to add the aldehyde before adding the mercapto acid; and the mercapto acid may be added, and it is desirable to add it, in moderate excess.

The ingredients thus brought together react to produce an acid of the type shown in Formula 1 or Formula 2 above, with X signifying hydrogen; but that acid is in solution. To obtain such acid in solid form, we add a large volume of water, to precipitate that acid. This precipitation may be facilitated by the addition of sodium chloride or other salting-out reagent. The solid acid thus obtained may be separated from the supernatant liquid in suitable manner, as by filtering, decanting, or centrifuging. As thus obtained it is an amorphous mass. This amorphous mass is washed well with water, and then dried, as in a vacuum desiccator.

Salts may readily be obtained from the acid so produced. To this end, the acid, as represented by Formula 1 or Formula 2 with X signifying hydrogen, is dissolved in a non-aqueous solvent, suitably in absolute alcohol, and is treated with a solution in the same solvent of a desired base, such as sodium hydroxide, ammonia, or the desired alkyl- or alkanolamine or polymethylenediamine. A salt is formed by the resultant reaction, and that salt precipitates because of its relative insolubility in the solvent used. If precipitation does not occur, or is incomplete, it may be produced or brought to completion by adding dry ether.

Examples of the general process are as follows:

*Example I.*—Ten and one-half grams of 4,4'-diaminodiphenyl sulphone are suspended (with some dissolving) in 50 cc. of 95% ethyl alcohol. To this mixture 7.5 cc. of 36% formalin solution (formaldehyde) is added, the solution is agitated, and 12.5 cc. of mercaptoacetic acid is added to it, followed by the addition of 25 cc. of water. A chemical reaction occurs, as is indicated by the fact that the reaction mixture becomes warm, and solution of the suspended solid matter takes place. The mixture is then treated with an aqueous solution of sodium carbonate until it becomes alkaline to litmus. Any unreacted 4,4'-diaminodiphenyl sulphone is removed, as by collecting on a filter; and the filtrate is dropped slowly, with stirring, into ice water containing dilute strong acid (suitably sulphuric acid or hydrochloric acid). The acid concentration is sufficient that when the entire filtrate has been added to it the solution is still strongly acid. An amorphous precipitate separates at this point. The supernatant liquid is decanted from it, and the precipitate is washed repeatedly with small amounts of ice water. The product is then dried, conveniently in a vacuum desiccator over phosphorus pentoxide. The dried material is dissolved in absolute alcohol, and an alcoholic solution of sodium hydroxide is added to it until the solution is distinctly alkaline to litmus. A white precipitate of the sodium salt separates. This is the sodium salt of 4,4'-bis(carboxymethylthiomethylamino)diphenyl sulphone, also called 4,4'-bis(carboxymethylthiomethylamino)phenylsulphonylbenzene. This is collected on a filter, washed well with absolute alcohol to remove any sodium hydroxide which may be absorbed, and finally dried, conveniently in a desiccator over phosphorus pentoxide. The sodium salt thus obtained is very readily soluble in water, and insoluble in absolute alcohol, ether, chloroform, carbon tetrachloride, and other nonpolar solvents. This sodium salt has the following formula:

(5) 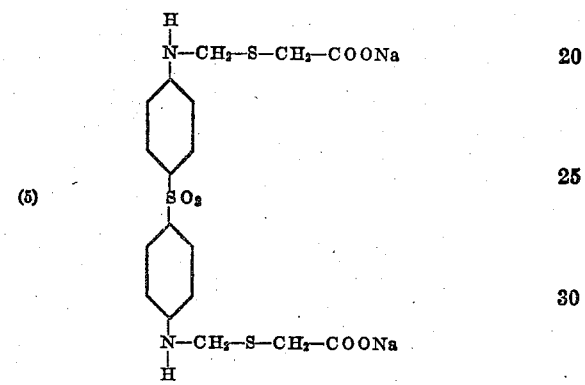

This product has been found effective in oral doses of 2.5 milligrams against pneumococci, and in oral doses of 0.2 milligram against virulent hemolytic streptococci, introduced into mice by experimental inoculation.

It may also be administered parenterally, subcutaneously, intravenously, or intramuscularly, in aqueous solution.

*Example II.*—Example I may be repeated save that only half the quantities of formaldehyde and mercaptoacetic acid are used. The resultant product contains the sodium salt of 4-amino-4'-carboxymethylthiomethylaminodiphenyl sulphone, alternatively called 4-amino-4'-carboxymethylthiomethylaminophenylsulphonylbenzene, which has the following formula:

(6) 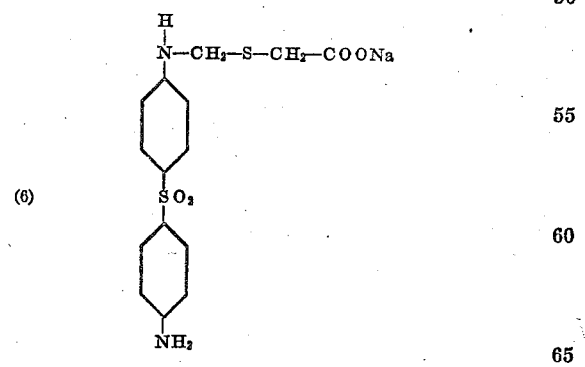

The resultant product also contains the disubstituted salt of Formula 5 above.

It also is found effective against both pneumococcal and streptococcal infections, in about the same doses as those of the product of Example I, although it is more toxic; but the greater toxicity does not interfere with its effectiveness.

*Example III.*—The same procedure is employed as in either Example I or Example II, but using beta-mercaptopropionic acid instead of mercaptoacetic acid, in amounts which are molecular equivalents of those given in the earlier examples.

The sodium salts thus obtained have the following formulas for the disubstituted and monosubstituted products respectively:

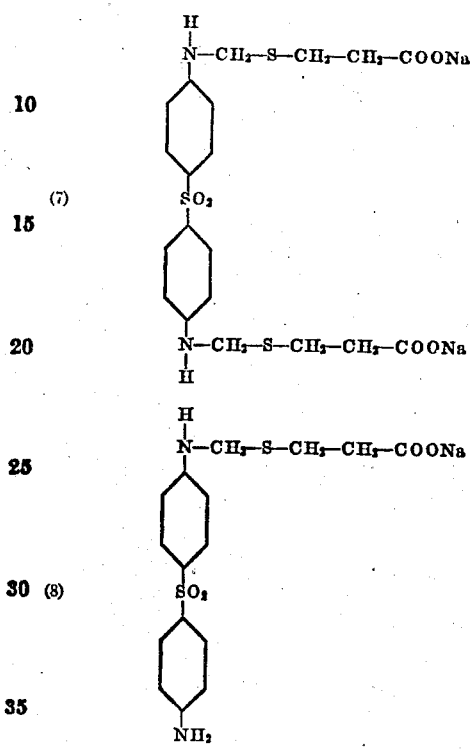

(7)

(8)

*Example IV.*—The same procedure is used as in either of Examples I and II, but with alpha-mercaptopropionic acid instead of mercaptoacetic acid, using the same amounts as for Example III.

The sodium salts thus obtained have the following formulas for the disubstituted and monosubstituted products respectively:

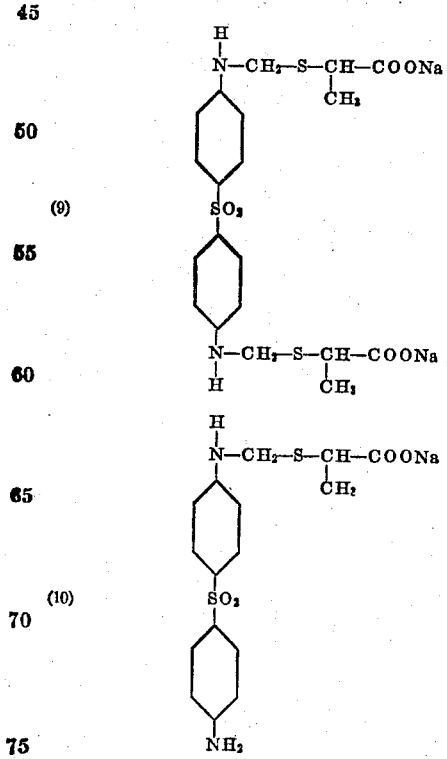

(9)

(10)

*Example V.*—Essentially the same procedure with a slight modification is followed when 4-mercaptobenzenesulphonic acid is used in the place of the aliphatic mercapto acids of Examples I to IV, inclusive. The modification is due to the fact that the final condensation product is relatively soluble in water, so that it is not precipitated in good yield by the addition of acid to the sodium salt. In order to obtain better yields we usually condense the theoretically calculated molecular equivalents of formaldehyde and the 4-mercaptobenzenesulphonic acid with the 4,4'-diaminodiphenyl sulphone in alcoholic solution, and precipitate the sodium salts directly by the addition of a solution of sodium hydroxide in absolute alcohol.

The sodium salts thus obtained have the following formulas for the disubstituted and monosubstituted products respectively:

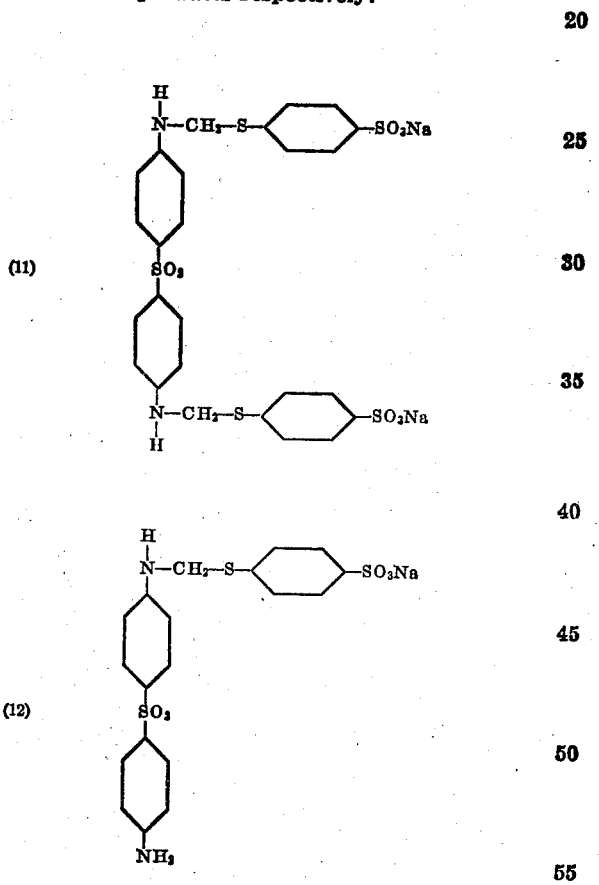

(11)

(12)

*Example VI.*—A slight modification of the procedure of Example V is made when the beta-mercaptoethanesulphonic acid derivative instead of the 4-mercaptobenzenesulphonic acid derivative of 4,4'-diaminodiphenyl sulphone is prepared. Because the free beta-mercaptoethanesulphonic acid is difficult to prepare and maintain in a high state of purity, it is profitable to effect the desired condensation by the addition of a concentrated aqueous solution of its sodium salt, acidified with hydrochloric or sulphuric acid, to the alcoholic suspension of the 4,4'-diaminodiphenyl sulphone and the formaldehyde. After addition of the alcoholic sodium hydroxide solution the product is isolated as the sodium salt by the same procedures as in the other examples.

The sodium salts thus obtained have the following formulas for the disubstituted and monosubstituted products respectively:

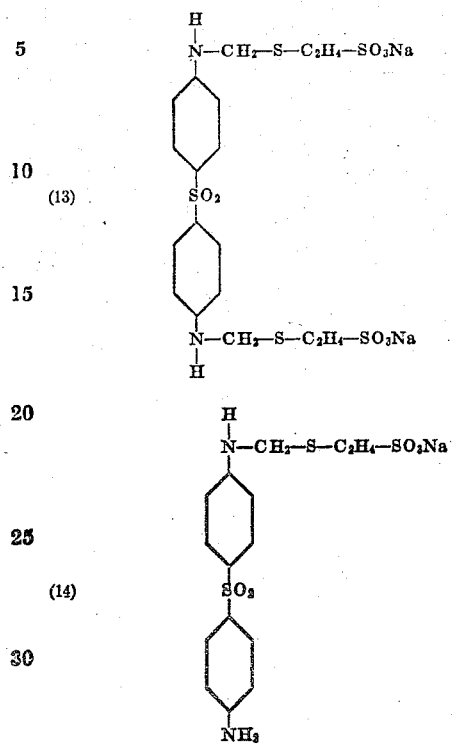

*Example VII.*—If, instead of the 4-mercaptobenzenesulphonic acid of Example V, we employ thiosalicylic (2-mercaptobenzoic) acid, then the procedure outlined in Examples I and II may be followed without any modification to obtain the respective derivatives. The sodium salts so obtained are represented by the following formulas:

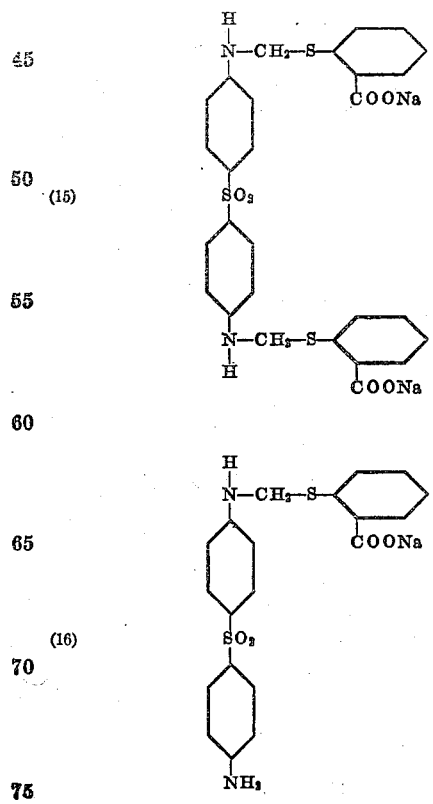

*Example VIII.*—To five grams of 4,4'-diaminodiphenyl sulphone suspended (with some dissolving) in 25 cc. of absolute alcohol are added 3.5 cc. of formalin and 6.5 grams of N-acetylcysteine. The mixture is allowed to stand for several hours. It is then treated with sodium carbonate, and the insoluble material then present is removed, as by filtration, and rejected. The filtrate is chilled, and acidified with dilute hydrochloric acid. A pale yellow gum separates. It is important not to use too strong acid, as otherwise complete solution of the gum occurs. The pale yellow gum is dried in vacuum, desirably over phosphorus pentoxide. It is then extracted with absolute alcohol. To this alcoholic extract an alcohol solution of sodium hydroxide is added. A precipitate separates; and is collected on a filter and dried in vacuo. An analysis for nitrogen showed 8.58%, which is in good agreement with the calculated 8.72% required by the following formula:

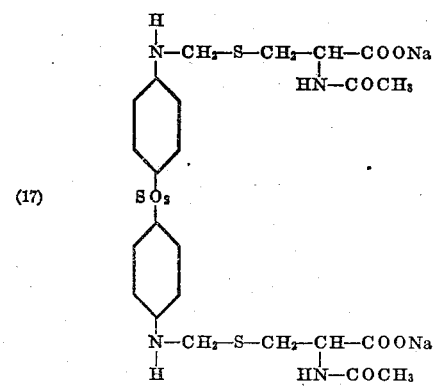

*Example IX.*—The disubstituted compounds of the types produced in Examples I and III inclusive may also be produced by a unit action of the desired mercapto acid with N,N'-di-R-4,4'-diaminodiphenyl sulph in which R is an alkylidene or alkenylidene having not over six carbon atoms as it has been defined. For instance, if R is the me group, these disubstituted compounds m be prepared by the following procedure:

N,N'-dimethylene-4,4'-diaminodipher phone, dissolved or suspended in alcohol, ethyl acetate, or other suitable solvent, is with two (or a slight excess over two) m equivalents of the desired mercapto aci following reaction takes place:

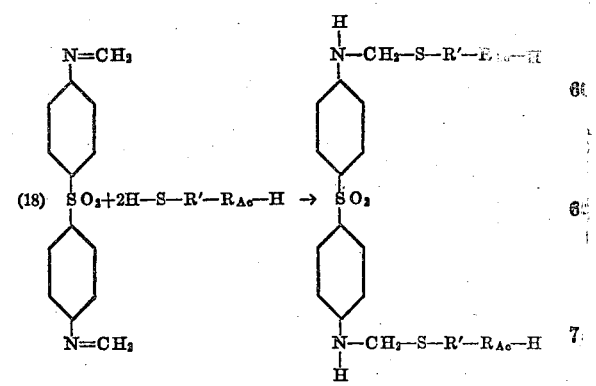

A solution usually results of the free acids thus produced. These free acids can be isolated by evaporation of the solvent. Their salts, for example their sodium salts, may be obtained as those salts were obtained in Examples I and III to VIII inclusive.

If instead of two molecular equivalents of the mercapto acid only one molecular equivalent is used, the reaction is as follows:

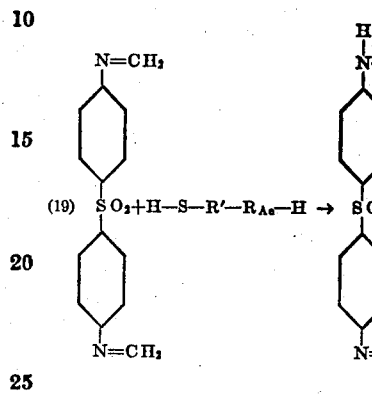

The acids thus produced may also be isolated by evaporation of the solvent; and salts may be prepared from them as in Examples II to VIII inclusive. Those salts are antistreptococcal and antipneumococcal agents, and may be administered orally or parenterally, conveniently intravenously.

The compound N,N'-dimethylene-4,4'-diaminodiphenyl sulphone used in this Example IX is new with us, and has not been previously described. It is obtained in excellent yield by treating 4,4'-diaminodiphenyl sulphone, suspended (with some solution) in alcohol, with slightly more than two molecular equivalents of formaldehyde solution (formalin). Care must be taken to avoid the introduction of either acids or strong bases. The N,N'-dimethylene-4,4'-diaminodiphenyl sulphone thus produced may be obtained in separated form by evaporating the alcohol in vacuo. It is readily soluble in alcohol and in acetone; and it readily condenses with mercapto acids to produce condensation products which yield water-soluble salts.

The foregoing examples give some of the possible variations of the mercapto acid used. Not only may the mercapto acid used be varied, but aldehydes other than formaldehyde may be used. So far as the aldehyde used is concerned, the reaction depends only on the presence of the —CHO group. When acetaldehyde is used instead of formaldehyde, the derivatives obtained may be represented by the general formulas:

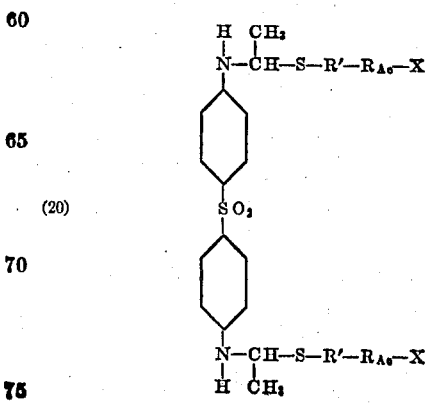

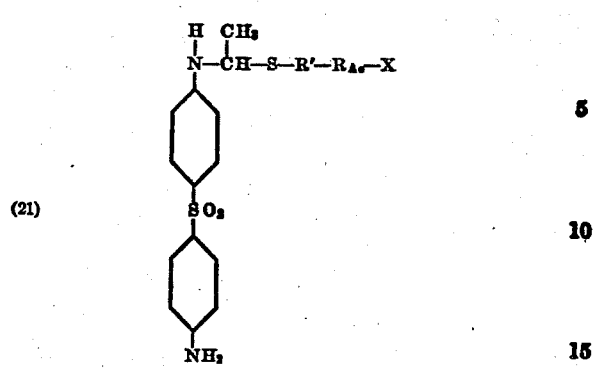

in which R', R$_{Ac}$, and X have the same significance as in Formulas 1 and 2.

Because of the susceptibility of the compound produced to acid hydrolysis, the preferred procedure when acetaldehyde is used instead of formaldehyde is essentially that of Example V rather than that of Examples I and II. For example:

*Example X*—To one molecular equivalent of 4,4'-diaminodiphenyl sulphone, suspended (with some dissolving) in absolute alcohol, is added one, or two, molecular equivalents of acetaldehyde, and one, or two, molecular equivalents of mercaptoacetic acid, according to whether a monosubstituted derivative or a disubstituted derivative is desired. The sodium salt is then precipitated directly from alcoholic solution as described in Example V, and is collected and dried as before.

The product thus obtained has the following formulas for the disubstituted and the monosubstituted products respectively:

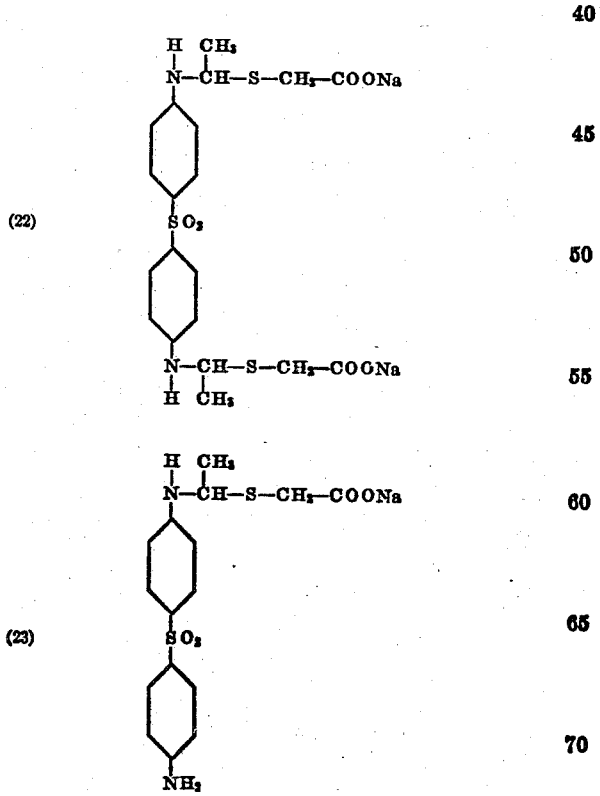

*Example XI.*—Example X above is repeated except that instead of acetaldehyde acrolein is used. The product obtained has the following formulas for the disubstituted and the monosubstituted products respectively:

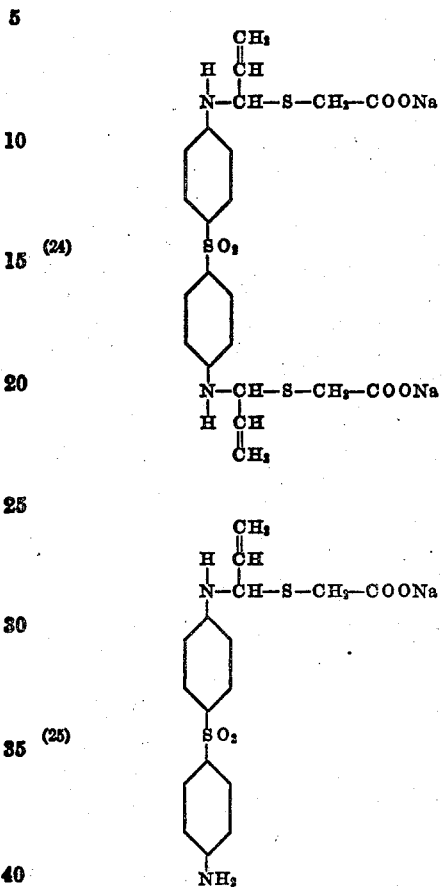

In Examples I to IX inclusive, the structure as indicated in Formulas 5 to 19 inclusive show N, N' substituted 4,4'-diaminodiphenyl sulphone without any methylol group in the benzene nucleus. It is known that, when an aromatic primary amine is treated with formaldehyde in acid solution, some of the formaldehyde tends to condense with the aromatic ring to yield a methylol derivative. It is therefore possible that the products resulting from the practice of the methods described in Examples I to IX contain some of the methylol groups in the benzene ring. We have been unable to ascertain the precise amount of the methylol compounds in the reaction product of each of these examples.

We claim as our invention:

1. A substituted 4,4'-diaminodiphenyl sulphone in which a hydrogen atom of at least one of the two amino groups is substituted by a radical of the following general formula:

—R—S—R'—$R_{Ac}$—X in which R represents a member of the general class of short-chain alkylidene and alkenylidene groups having not over six carbon atoms; R' represents a divalent radical of the class consisting of monocarbon and polycarbon hydrocarbon groups and those substituted polycarbon hydrocarbon groups in which a hydrogen atom on a carbon atom not attached to sulphur is replaced by a group of the class consisting of the hydroxyl group and acylated hydroxyl groups and acylated amino groups; $R_{Ac}$ represents an acidic group of the class consisting of the carboxylic-acid and sulphonic-acid groups; and X represents a member of the class of positive ions consisting of hydrogen, the alkali metals, the alkaline-earth metals, and the nitrogen hydroonium ions derived from ammonia, the alkylamines, the alkanolamines, and the polymethylenediamines.

2. A disubstituted 4,4'-diaminodiphenyl sulphone which is represented by the following general formula:

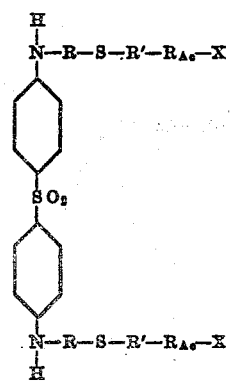

in which R represents a member of the general class of short-chain alkylidene and alkenylidene groups having not over six carbon atoms; R' represents a divalent radical of the class consisting of monocarbon and polycarbon hydrocarbon groups and those substituted polycarbon hydrocarbon groups in which a hydrogen atom on a carbon atom not attached to sulphur is replaced by a group of the class consisting of the hydroxyl group and acylated hydroxyl groups and acylated amino groups; $R_{Ac}$ represents an acidic group of the class consisting of the carboxylic-acid and sulphonic-acid groups; and X represents a member of the class of positive ions consisting of hydrogen, the alkali metals, the alkaline-earth metals, and the nitrogen hydroonium ions derived from ammonia, the alkylamines, the alkanolamines, and the polymethylenediamines.

3. A monosubstituted 4,4'-diaminodiphenyl sulphone which is represented by the following general formula:

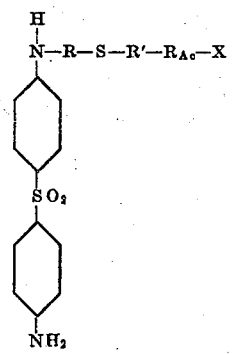

in which R represents a member of the general class of short-chain alkylidene and alkenylidene groups having not over six carbon atoms; R' represents a divalent radical of the class consisting of monocarbon and polycarbon hydrocarbon groups and those substituted polycarbon hydrocarbon groups in which a hydrogen atom on a carbon atom not attached to sulphur is replaced by a group of the class consisting of the hydroxyl group and acylated hydroxyl groups and acylated amino groups; R_Ac represents an acidic group of the class consisting of the carboxylic-acid and sulphonic-acid groups; and X represents a member of the class of positive ions consisting of hydrogen, the alkali metals, the alkaline-earth metals, and the nitrogen hydro-onium ions derived from ammonia, the alkylamines, the alkanolamines, and the polymethylenediamines.

4. A substituted 4,4'-diaminodiphenyl sulphone as set forth in claim 1, in which R has not to exceed two carbon atoms.

5. A substituted 4,4'-diaminodiphenyl sulphone as set forth in claim 1, in which R is a methylene group.

6. A substituted 4,4'-diaminodiphenyl sulphone as set forth in claim 1, in which R' is a polymethylene group.

7. A substituted 4,4'-diaminodiphenyl sulphone as set forth in claim 1, in which R' is an arylene group.

8. A substituted 4,4'-diaminodiphenylsulphone as set forth in claim 1, in which R_Ac is a carboxylic acid group.

9. A substituted 4,4'-diaminodiphenyl sulphone as set forth in claim 1, in which R_Ac is the sulphonic acid group.

10. A substituted 4,4'-diaminodiphenyl sulphone as set forth in claim 1, in which R is the methylene group, R' is a polymethylene group, and R_Ac is the carboxylic acid group.

11. A substituted 4,4'-diaminodiphenyl sulphone as set forth in claim 1, in which R is the methylene group, R' is a polymethylene group, and R_Ac is the sulphonic acid group.

12. A substituted 4,4'-diaminodiphenyl sulphone as set forth in claim 1, in which R is the methylene group, R' is an arylene group, and R_Ac is the sulphonic acid group.

13. The process of producing a substituted 4,4'-diaminodiphenyl sulphone, which consists in treating 4,4'-diaminodiphenyl sulphone with an aldehyde of the general formula: R=O in which R represents a member of the general class of short-chain alkylidene and alkenylidene groups having not over six carbon atoms; and with a mercapto acid.

14. The process of producing a substituted 4,4'-diaminodiphenyl sulphone as set forth in claim 13, in which the aldehyde is formaldehyde.

15. The process of producing a substituted 4,4'-diaminodiphenyl sulphone as set forth in claim 13, in which the mercapto acid is beta mercaptopropionic acid.

16. The process of producing a substituted 4,4'-diaminodiphenyl sulphone as set forth in claim 13, in which the mercapto acid is a mercapto sulphonic acid.

17. The process of producing a substituted 4,4'-diaminodiphenyl sulphone, which consists in treating an N,N'-di-R-4,4'-diaminodiphenyl sulphone, in which R represents a member of the general class of short-chain alkylidene and alkenylidene groups having not over six carbon atoms, with a mercapto acid.

18. The process as set forth in claim 17, in which the N,N'-di-R-4,4'-diaminodiphenyl sulphone is N,N'-dimethylene-4,4'-diaminodiphenyl sulphone.

19. A di-substituted 4,4-diaminodiphenyl sulphone which is represented by the following formula:

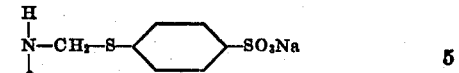
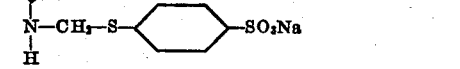
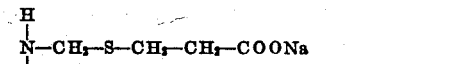

20. A di-substituted 4,4'-diaminodiphenyl sulphone which is represented by the following formula:

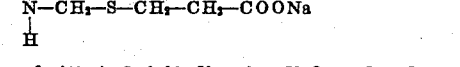
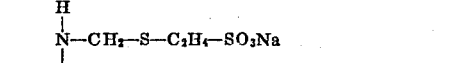

21. A di-substituted 4,4'-diaminodiphenyl sulphone which is represented by the following formula:

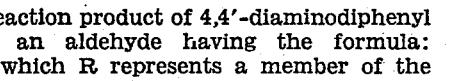

22. A reaction product of 4,4'-diaminodiphenyl sulphone, an aldehyde having the formula: R=O in which R represents a member of the general class of short-chain alkylidene and alkenylidene groups having not over six carbon atoms; and a mercapto acid having the following formula: H—S—R'—R_Ac—H in which R' represents a divalent radical of the class consisting of monocarbon and polycarbon hydrocarbon groups and those substituted polycarbon hydrocarbon groups in which a hydrogen atom on a carbon atom not attached to sulphur is replaced by a group of the class consisting of the hydroxyl group and acylated hydroxyl groups and acylated amino groups; and R_Ac represents an acidic group of the class consisting of the carboxylic-acid and sulphonic-acid groups.

23. A reaction product of 4,4'-diaminodiphenyl sulphone, an aldehyde having the formula: R=O in which R represents a member of the general class of short-chain alkylidene and alkenylidene groups having not over six carbon atoms; and a mercapto acid having the following formula: H—S—R′—R$_{Ac}$—H in which R′ represents a divalent radical of the class consisting of monocarbon and polycarbon hydrocarbon groups and those substituted polycarbon hydrocarbon groups in which a hydrogen atom on a carbon atom not attached to sulphur is replaced by a group of the class consisting of the hydroxyl group and acylated hydroxyl groups and acylated amino groups; and R$_{Ac}$ represents an acidic group of the class consisting of the carboxylic-acid and sulphonic-acid groups; said reaction product having only one amino group of said 4,4′-diaminodiphenyl sulphone substituted.

24. A reaction product of 4,4′-diaminodiphenyl sulphone, an aldehyde having the formula: R=O in which R represents a member of the general class of short-chain alkylidene and alkenylidene groups having not over six carbon atoms; and a mercapto acid having the following formula: H—S—R′—R$_{Ac}$—H in which R′ represents a divalent radical of the class consisting of monocarbon and polycarbon hydrocarbon groups and those substituted polycarbon hydrocarbon groups in which a hydrogen atom on a carbon atom not attached to sulphur is replaced by a group of the class consisting of the hydroxyl group and acylated hydroxyl groups and acylated amino groups; and R$_{Ac}$ represents an acidic group of the class consisting of the carboxylic-acid and sulfonic-acid groups; said reaction product having both amino groups of said 4,4′-diamino-diphenyl sulphone substituted.

25. A product as set forth in claim 22, in which R has not to exceed two carbon atoms.

26. A product as set forth in claim 22, in which R is a methylene group.

27. A product as set forth in claim 22, in which R′ is a polymethylene group.

28. A product as set forth in claim 22, in which R′ is an arylene group.

29. A product as set forth in claim 22, in which R$_{Ac}$ is a carboxylic acid group.

30. A product as set forth in claim 22, in which R$_{Ac}$ is a sulphonic acid group.

31. A product as set forth in claim 22, in which R is the methylene group, R′ is a polymethylene group, and R$_{Ac}$ is the carboxylic acid group.

32. A product as set forth in claim 22, in which R is the methylene group, R′ is a polymethylene group, and R$_{Ac}$ is the sulphonic-acid group.

33. A product as set forth in claim 22, in which R is the methylene group, R′ is an arylene group, and R$_{Ac}$ is the sulphonic acid group.

34. The process of producing a reaction product, which consists in treating 4,4′-diaminodiphenyl sulphone with an aldehyde of the general formula: R=O in which R represents a member of the general class of short-chain alkylidene and alkenylidene groups having not over six carbon atoms; and with a mercapto acid.

35. The process of producing a reaction product as set forth in claim 34, in which the aldehyde is formaldehyde.

36. The process of producing a reaction product as set forth in claim 34, in which the mercapto acid is β-mercapto-propionic acid.

37. The process of producing a reaction product as set forth in claim 34, in which the mercapto acid is a mercapto sulphonic acid.

38. The process of producing a reaction product which consists in treating the reaction product of 4,4′-diaminodiphenyl sulphone and an aldehyde having the formula: R=O in which R represents a member of the general class of short-chain alkylidene and alkenylidene groups having not over six carbon atoms with a mercapto acid.

39. The process as set forth in claim 38, in which the aldehyde employed is formaldehyde.

40. A salt of a reaction product of 4,4′-diaminodiphenyl sulphone, an aldehyde having the formula: R=O in which R represents a member of the general class of short-chain alkylidene and alkenylidene groups having not over six carbon atoms and a mercapto acid, said salt having a positive ion selected from the group which consists of the alkali metals, the alkaline-earth metals, and the nitrogen hydro-onium ions derived from ammonia, the alkylamines, the alkanolamines, and the polymethylenediamines.

41. A salt of a reaction product of 4,4′-diaminodiphenyl sulphone, an aldehyde having the formula: R=O in which R represents a member of the general class of short-chain alkylidene and alkenylidene groups having not over six carbon atoms and a mercapto acid having the following formula: H—S—R′—R$_{Ac}$—H in which R′ represents a divalent radical of the class consisting of monocarbon and polycarbon hydrocarbon groups and those substituted polycarbon hydrocarbon groups in which a hydrogen atom on a carbon atom not attached to sulphur is replaced by a group of the class consisting of the hydroxyl group and acylated hydroxyl groups and acylated amino groups; and R$_{Ac}$ represents an acidic group of the class consisting of the carboxylic-acid and sulphonic-acid groups; said reaction product having only one amino group of said 4,4′-diaminodiphenyl sulphone substituted; said salt having a positive ion selected from the group which consists of the alkali metals, the alkaline-earth metals, and the nitrogen hydro-onium ions derived from ammonia, the alkylamines, the alkanolamines, and the polymethylenediamines.

42. A salt of a reaction product of 4,4′-diaminodiphenyl sulphone, an aldehyde having the formula: R=O in which R represents a member of the general class of short-chain alkylidene and alkenylidene groups having not over six carbon atoms and a mercapto acid having the following formula: H—S—R′—R$_{Ac}$—H in which R′ represents a divalent radical of the class consisting of monocarbon and polycarbon hydrocarbon groups and those substituted polycarbon hydrocarbon groups in which a hydrogen atom on a carbon atom not attached to sulphur is replaced by a group of the class consisting of the hydroxyl group and acylated hydroxyl groups and acylated amino groups; and R$_{Ac}$ represents an acidic group of the class consisting of the carboxylic-acid and sulphonic-acid groups; said reaction product having both amino groups of said 4,4′-diaminodiphenyl sulphone substituted; said salt having a positive ion selected from the group which consists of the alkali metals, the alkaline-earth metals, and the nitrogen hydro-onium ions derived from ammonia, the alkylamines, the alkanolamines, and the polymethylenediamines.

MORRIS S. KHARASCH.
OTTO REINMUTH.